Feb. 8, 1966  J. VAN DER STER ETAL  3,233,419
ACETYLENE SAFEGUARDING FOR GAUZE-ICE SEPARATOR
Filed Jan. 21, 1963  5 Sheets-Sheet 1

INVENTOR
JOHANNES VAN DER STER
ALDERT T. BLOEM
BY
AGENT

United States Patent Office 3,233,419
Patented Feb. 8, 1966

3,233,419
ACETYLENE SAFEGUARDING FOR
GAUZE-ICE SEPARATOR
Johannes van der Ster and Aldert Teunis Bloem, Emmasingel, Eindhoven, Netherlands, assignors to North American Philips Company Inc., New York, N.Y., a corporation of Delaware
Filed Jan. 21, 1963, Ser. No. 252,798
Claims priority, application Netherlands, Jan. 22, 1962, 273,834
5 Claims. (Cl. 62—42)

The invention relates to methods and devices for separating out, in the solid state, constituents of a gas mixture by cooling.

An object of the present invention is to provide a method of driving a device for separating out, in the solid state, constituents of a gas mixture by cooling. The device furthermore comprises one or more gas-pervious walls, for example of gauze, which are cooled by their thermal contact with supports including ducts containing a fluid, for example fluid air, the boiling point of which is lower than the temperature with which the constituents to be separated out become solid. The fluid, when fed to the device, contains small quantities of explosive impurities such as acetylene in the dissolved state, while the quantity of liquid contained in the device is kept constant.

Such devices are employed, for example, for separating out given constituents such as water vapor and hydrocarbon from gas mixtures like air, which are condensed on the cold head of cold-gas refrigerators, before condensation appears. During the cooling process said constituents become solid at temperatures which are considerably higher than those required for condensing air, while they are deposited in the form of snow on the gas-pervious walls. The gas-pervious walls are then cooled by evaporating liquid air in the ducts of the device. The quantity of liquid contained in the ducts is kept constant.

Although in practice these devices are mostly used for purifying air, it will be obvious that they may be employed with equal success in those cases in which other gas mixtures than air must be freed from constituents.

It should be noted that atmospheric air always contains a certain quantity of acetylene and other explosive substances. Although the acetylene is deposited for a large part in the form of snow on the gas-pervious walls, the temperature of these gas-pervious walls is, however, not sufficiently low for the whole quantity of acetylene to be frozen out, so that after the air has passed through the device it still contains a certain amount of acetylene. After the air has been liquefied, there is consequently a given amount of acetylene in the liquid air. This percentage of acetylene is, however, so small that there is no danger of explosion. The liquefied air is then fed to the ducts in the device, so that the supplied quantity just corresponds to the quantity of evaporated air in these ducts. Since the air evaporates in the ducts in contradistinction to the acetylene, it has been found that an accumulation of acetylene occurs in the device, the extent of which may be such that the acetylene is separated out in a solid state and floats in the liquid air in the form of particles. This is very harmful since there remains the risk of danger of explosion.

It is known to avoid the accumulation of acetylene in such systems by purifying the supplied air, prior to its entry in the system, from acetylene and other hydrocarbons. This may be carried out for example by absorption on silica gel.

In order to avoid the accumulation of acetylene in a device of the kind set forth, a method of driving such a device is, in accordance with the invention, characterized in that a quantity of liquid is fed per unit time to the device which quantity exceeds the quantity of liquid evaporating in the device per unit time owing to the supply of heat, the difference quantity being withdrawn from the device, while provisions are made to ensure that this difference quantity is such that in the state of equilibrium the concentration of the explosive impurities dissolved in the liquid remains below the established permissible limit.

The accumulation of acetylene in the device is thus avoided by withdrawing continuously part of the liquid with a fairly high percentage of acetylene from the device and by replacing it by a quantity of liquid having a low percentage of acetylene, said substituted quantity being, however, colder than the liquid contained in the ducts.

In order to prevent the liquid in the ducts from assuming too low a temperature, provisions are made in a further method embodying the invention, that the difference between the quantity of liquid fed to the device per unit time and the quantity of liquid evaporating in the ducts is so high that in the state of equilibrium the concentrations of the explosive impurities contained in the liquid are kept below the permissible limit and that the vapor which is in a state of equilibrium with the liquid in the ducts, has substantially the same composition as the purified gas mixture.

The invention furthermore relates to a device for separating out constituents, in the solid state, from a gas mixture by cooling, said device forming part of a system for liquefying air and being suitable for carrying out the method described above. The device comprises one or more gas-pervious walls, which are in thermal contact with supports provided with cooling ducts, which communicate at their upper end and at their bottom end with an upper and a lower common space respectively. These spaces have between them a duct through which liquid can flow back from the upper space to the lower space, the device communicating, moreover, with a container of liquid air, there being provided means for maintaining a constant level of the liquid in said container, said device comprising an outlet for liquid, which outlet is constructed so that the explosive substances contained in the liquid in the device, for example acetylene, cannot exceed the permissible concentrations.

According to another feature of the invention the duct through which liquid can flow back from the upper space to the lower space surrounds at least partly the container of liquid air, the wall of the container being provided with one or more bores at different levels.

Owing to the bores at different levels a certain degree of mixing occurs between the liquid in the reflux duct, which liquid contains a fairly high percentage of acetylene, and the liquid in the container, which liquid has a much lower percentage of acetylene.

A further device embodying the invention communicates with a duct through which liquid can flow out of the device and which opens out in an evaporator in which said liquid is completely evaporated. Said duct is proportioned so that the quantity of liquid withdrawn from the device has a value such that the temperature of the liquid in the device differs only little from the initial condensation temperature of air. By evaporating completely the withdrawn quantity of liquid it is ensured that with the air the dissolved acetylene is also evaporated, so that no explosion will occur.

A further embodiment of the invention is that it communicates with a pump, for example a vapor bubble pump. The yield of said pump must, of course, fulfill the aforesaid conditions, while the supplied liquid may be completely evaporated. In accordance with the invention said pump may be formed by a vapor bubble pump having a linear yield characteristic curve. This has the advantage that with regard to heat supply to said pump no narrow limits are imposed.

In a further advantageous device embodying the invention the liquid outlet ducts communicating with the pump open out in a further container for the liquid product. This construction has the advantage that the liquid withdrawn from the device is not lost.

A device embodying the invention in which the withdrawal of liquid air from the system is carried out with the aid of a vapor bubble pump in that the downtake of the vapor bubble pump, as an overflow, communicates with the collecting container for liquid air and in that between the lower part of the device and the supply part of the vapor bubble pump there is provided a communication, through which communicating duct, which, of course, has only a narrow passage, part of the liquid in the device is conducted away by the vapor bubble pump together with the liquid air.

In a further embodiment the device according to the invention at least one of the evaporator ducts of the device communicates at its upper end with the said collecting container. The liquid pumped up in said duct by the vapor bubble pump effect produced therein flows into the collecting container and is conducted away from this container out of the system partly together with the withdrawn flow of liquid.

In a further embodiment one of the evaporating ducts of the device opens out in the downtake of the vapor bubble pump. It is thus ensured that the liquid flowing out of the device and having a higher percentage of acetylene is no longer mixed with the liquid air in the collecting container, having a lower percentage of acetylene. The vapor bubble pump conducts this liquid away from the system.

In a further embodiment the device according to the invention the lower part of the device communicates with an ascending duct which opens out in the collecting container for the product supplied by the vapor bubble pump, which collecting container communicates with an outlet duct, said ascending duct being arranged in the flow of the non-purified gas mixture. Owing to the arrangement of the uptake in the flow of the non-purified gas mixture, which is still fairly warm, a vapor bubble pump effect occurs in said duct, so that liquid is pumped out of the device into the collecting container In a further embodiment of the device according to the invention the ascending duct opens out in an overflow, which is accommodated in the collecting container and the bottom of which communicates with a duct which includes a liquid trap and which projects beyond the system, where it is provided with a checking cock, which is in the closed position in normal operation and which can be opened to check the operation of the ascending duct.

The invention will be described more fully with reference to the drawing, which is not drawn to scale and is an example only.

Figure 1:
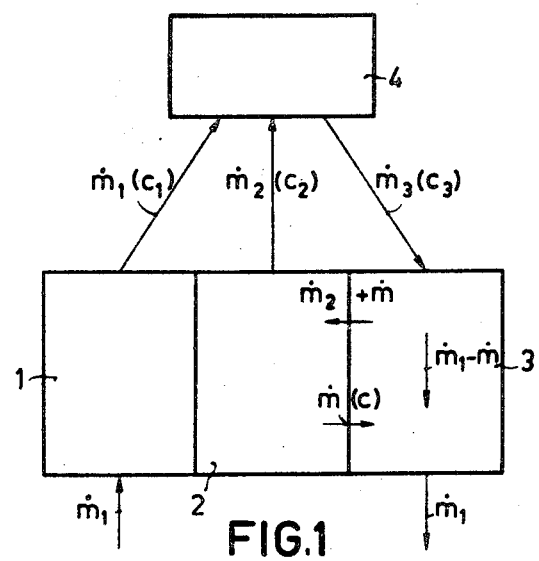
FIG. 1 shows diagrammatically a device for separating out constituents from a gas mixture by cooling.

In the diagram of FIG. 1 reference numeral 1 designates the gas-pervious wall of a device for separating out constituents from a gas mixture by cooling. Reference numeral 2 designates the cooling ducts being in thermal contact with said walls and 3 denotes a collecting container for the liquid air flowing out of the condenser 4. The medium streams in the system are indicated by arrows and the characters $m$ at the side of these arrows indicate the mass flows and the characters $c$ between brackets indicate the concentrations of acetylene in said mass flows.

The device operates as follows. The air $m_1$ to be processed passes through the gas-pervious wall 1 and arrives with a percentage $c_1$ in the condenser 4. The condenser 4 may be formed by the head of a cold-gas refrigerator. From the cooling ducts 2 ascends a vapor flow $m_2$, having a percentage $c_2$ of acetylene and also the flow enters the condenser space 4. In the condenser 4 the flows $m_1$ and $m_2$ are converted into the flow of condensate $m_3$. The flow $m_3$ of condensate from the condenser 4 has a percentage of acetylene of:

$$c_3 = \frac{m_1}{m_3} c_1$$

Part of this flow of condensate, corresponding to the quantity of liquid evaporating in the cooling ducts, is fed to the cooling ducts, while the remainder is withdrawn as a product. The percentage of acetylene of the withdrawn final product is equal to $c_3$ and it has been found that the percentage $c_2$ in the vapor ascending from the cooling ducts as compared with the percentage $c_1$ is negligibly small, so that in the cooling ducts an accumulation of acetylene per unit time ensues, which is equal to:

$$\frac{m_2 \cdot m_1}{m_3} c_1$$

In order to avoid this accumulation a mass flow $m$ is supplied to the cooling ducts exceeding the quantity of liquid evaporating in said ducts. This supplied mass flow has, of course, also a percentage $c_3$ of acetylene. At a different place the same mass flow $m$ is withdrawn from these cooling ducts, but the percentage $c$ of acetylene thereof is higher. By a correct choice of the value of the mass flow $m$ the percentage of acetylene in the cooling ducts can be kept below the permissible limit. It has been found that with a production of 33 liters of liquid air per hour and with an additional flow of liquid fed to the ducts of 2.7 liters per hour the accumulation of acetylene remains below the permissible limit, while no condensation of air in the gas-pervious wall 1 occurs.

Figure 2:
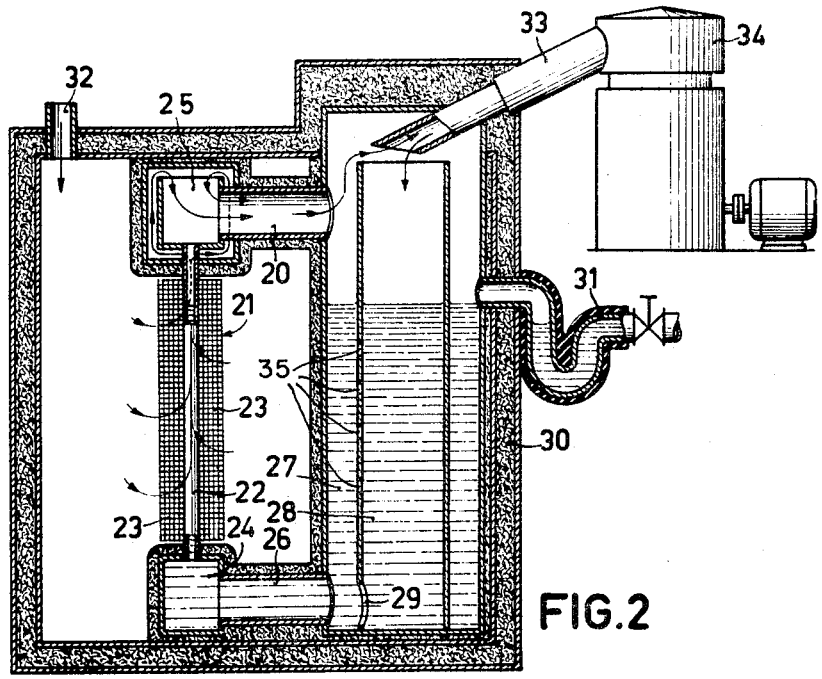
FIGS. 2, 3 and 4 show a system for liquefying air, while the measures are illustrated for avoiding accumulation of acetylene in the device for separating out undesirable constituents from the supplied air by cooling.
Figure 3:
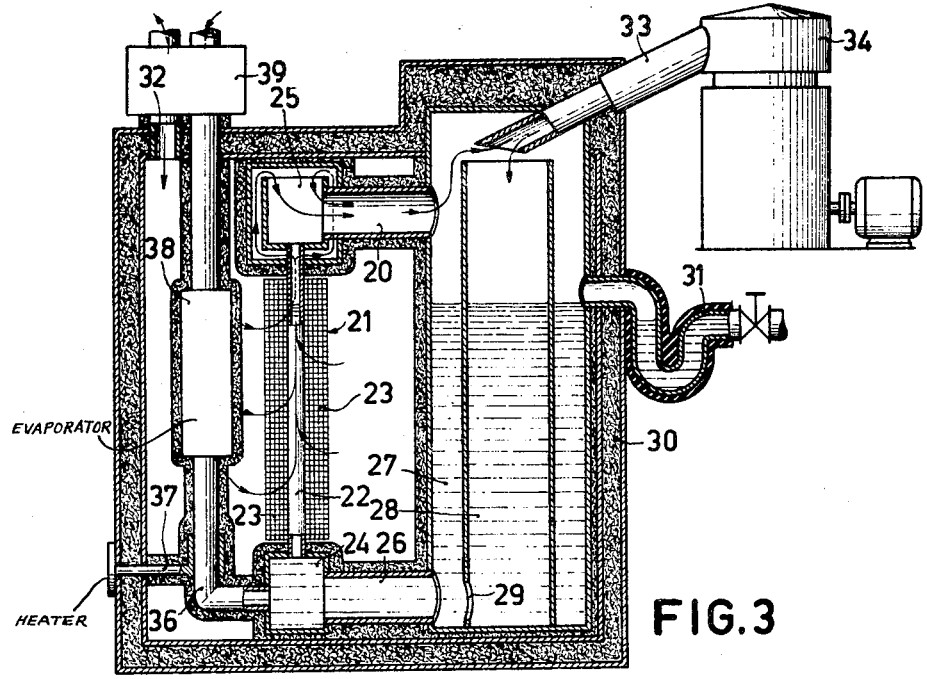
Figure 4:
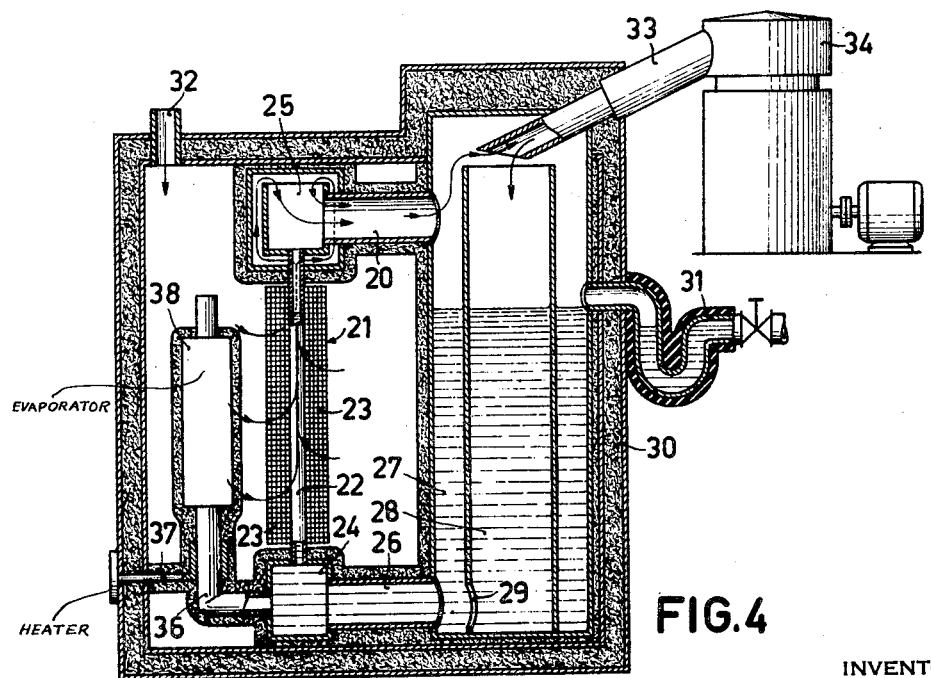

In FIGS. 2, 3 and 4 corresponding structural parts are denoted by the same reference numerals; 21 designates a device for separating out constituents in the solid state from a gas mixture. This device comprises a number of vertical pipes 22, to which gauze layers 23 are secured on either side. The pipes 22 open out at their lower ends in the space 24 and at their upper ends in a space 25. The space 24 communicates via a duct 26 with an annular container 27, which surrounds a further liquid container 28. The container 28 communicates via a bore 29 freely with the annular container 27 and hence via the duct 26 also with the device 21. The space 25 communicates via a duct 20 also with the container 27. The assembly is surrounded by an insulating jacket 30 and the liquid container 28 is provided with a liquid outlet duct 31. The insulating jacket 30 is furthermore provided with an air inlet 32 and after passing through the gauze layers 23 the air flows via the duct 33 to the cold-gas refrigerator 34, where it is liquefied. The liquefied air flows also via the duct 33 into the container 28. In operation, the liquid level in the container 28 of the device is maintained at a constant level, since the liquid cannot rise above the liquid outlet duct 31 in this container. The air entering the system via the air inlet opening 32 gives off heat on its way to the gauze layers 23, so that in the pipes 22 liquid air evaporates and a vapor bubble pump effect is produced therein, so that liquid air is pumped into the space 25, the liquid air flowing via the duct 20 to the annular container 27, from where it flows back into the space 24. Since the containers 27 and 28 communicate with each other via the bore 29, the quantity of liquid in the container 27 and in the device 21 remains constant, i.e., the quantity of liquid fed per unit time to the device 21 is equal to the quantity of liquid evaporated in the pipes 22 owing to the supply of heat. As stated above, acumulation of acetylene will thus occur.

A possibility of preventing such an accumulation of acetylene exists in that an additional quantity of liquid air is supplied to and withdrawn from the device 21.

As shown in FIG. 2 this is carried out by providing the wall of the container 28 with bores 35 positioned at different levels. Because of these bores a certain degree of mixing of the liquid in the container 27, which has a higher percentage of acetylene and of the liquid in the container 28 having a lower percentage of acetylene will occur, so that the percentage of acetylene of the liquid in the device 21 is reduced.

A further possibility of avoiding the accumulation of acetylene, illustrated in FIG. 3, consists in the provision of a liquid outlet duct 36, communicating with the space 24. By providing this duct 36 with a heat supply 37, a vapor bubble pump effect ensues so that via said duct a quantity of liquid air is withdrawn from the device 21. The withdrawn liquid may be supplied for example to an evaporator 38, in which it is completely evaporated. The evaporated liquid is then brought into thermal contact in a heat exchanger 39 with the supplied air, which is thus pre-cooled. This has the advantage that the cold of the vapor emanating from the system is not lost. It is furthermore possible to connect the duct 36, not to the evaporator 38, but to the outlet of the liquid product. If use is made of a member as shown in FIG. 3 for the outlet of liquid air from the device 21, the container 27 may, if desired, be omitted, while the reflux of the pumped-up liquid from the space 25 takes place via one of the ducts 22, said duct being then arranged so that a smaller amount of heat is fed thereto than to the further ducts.

FIG. 4 shows a further embodiment of the system for liquefying air, in which the vapor from the evaporator 38 is not introduced into a heat exchanger, but flows freely into the space in the insulating chamber 30. This cold vapor, having a high percentage of acetylene, flows then directly towards the cold-gas refrigerator. The acetylene contained in said vapor is deposited for the major part in the solid state on the gas-pervious walls of the device 21.

The liquid may be withdrawn from the device 21 not only by means of the heat supply device 37 and hence by means of a vapor bubble pump effect in the duct 36, but also by means of a liquid pump included in the duct 36.

Figure 5:
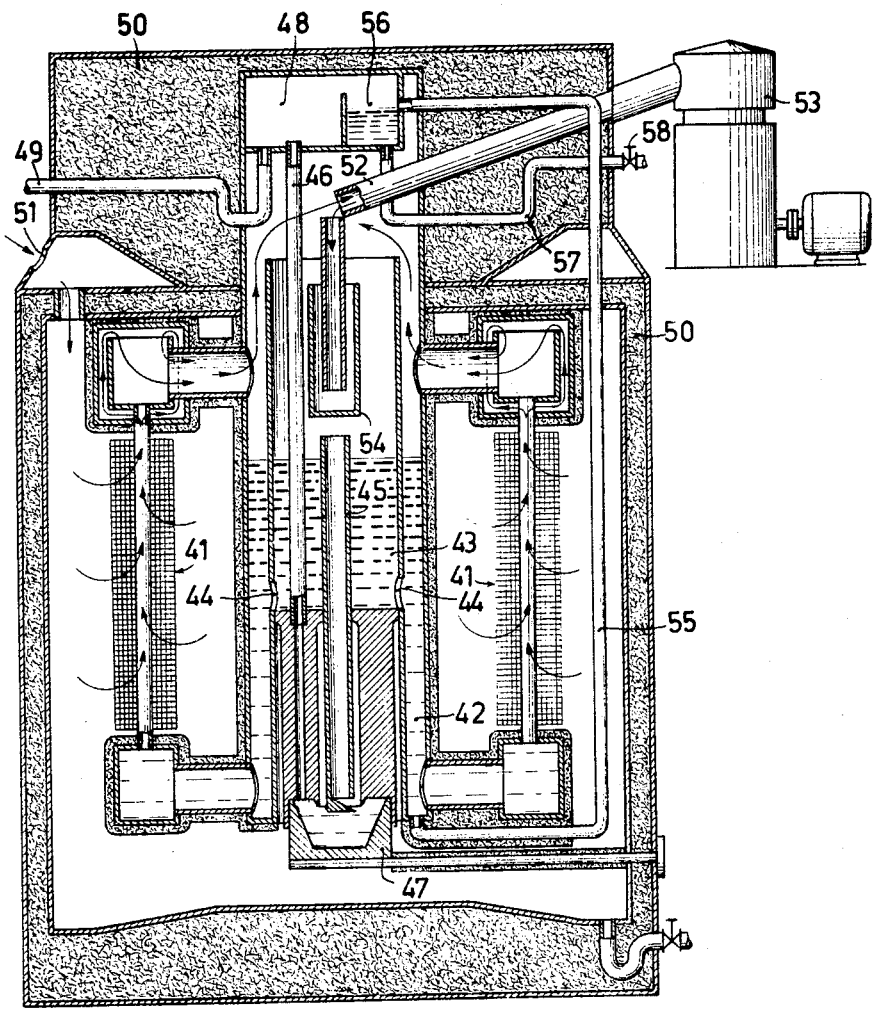
FIGS. 5, 6 and 7 show a further embodiment of the device shown in FIG. 2 in a sectional view.

FIG. 5 shows a system for liquefying air. This system comprises a number of devices 41 for separating out constituents in the solid state, for example water vapor and carbon dioxide from the air to be liquefied, said devices communicating freely at their lower ends with the annular container 42, which surrounds a further container 43. The devices 41 communicate at their top ends also with the container 42, so that the connection is located above the level of the liquid maintained in the containers 42 and 43 when the system is operative. The container 43 communicates via the bores 44 freely with the container 42. The downtake 45 of a vapor bubble pump is arranged in the container 43, which downtake serves as an overflow for the liquid in the container 43, so that the liquid level in said container remains constant. The vapor bubble pump is furthermore provided with an uptake 46, which is provided at its lower end with a heating member 47 and opens out at its top end in a liquid collecting container 48. With this container 48 communicates an outlet duct 49, including a liquid trap. The assembly is surrounded by an insulation 50, which has an air inlet opening 51. The air entering the system via the inlet opening 51 passes in the direction of the arrows through the devices 41 and flows via the ducts 52 to the cold-gas refrigerator 53. The air condenses on the head of the cold-gas refrigerator and the condensate flows back through the ducts 52, while the collecting trough 54 provides that the condensate cannot enter directly the downtake 45 of the vapor bubble pump, but that it is collected in the container 43.

In order to avoid the accumulation of acetylene in the devices 41, the container 42 of FIG. 5 communicates with a duct 55, which extends in upward direction through the inlet space of the entering air and opens out in the overflow 56 arranged in the container 48, said overflow communicating with a duct 57, including a closing member 58. Since the duct 55 is arranged in the warm flow of air a vapor bubble pump effect ensues so that via this duct a quantity of liquid air having a higher percentage of acetylene flows out of the container 42 and indirectly also out of the device 41 into the overflow 56. Thus it is again ensured that the percentage of acetylene in the device 41 remains below the permissible limit. In order to check the pumping effect in the duct 55, a duct 57 communicates with the overflow 56, said duct being provided with the closing member 58, so that it is possible to state, whether subsequent to opening of the member 58, liquid flows out of said duct. If this is not the case, this means that no liquid is pumped up through the duct 55, so that acetylene accumulation in the devices 41 may occur and the required measures must be taken.

Figure 6:
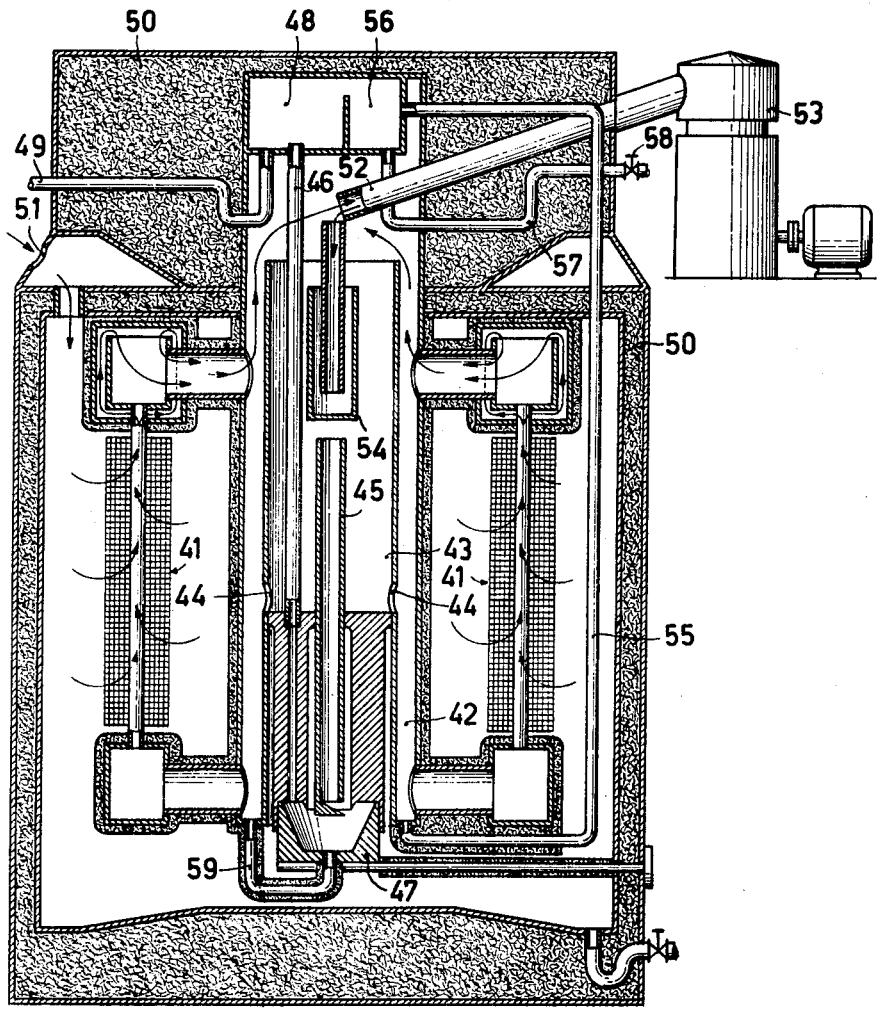

FIG. 6 shows a system similar to that shown in FIG. 5 with corresponding structural parts being designated by the same reference numerals. In order to avoid accumulation of acetylene in the devices 41, this system is provided with a duct 59, which communicates at one end with the container 42 and at its other end with the vapor bubble pump. It is thus ensured that part of the liquid in the devices 41 is conducted away continuously by the vapor bubble pump together with the product.

Figure 7:
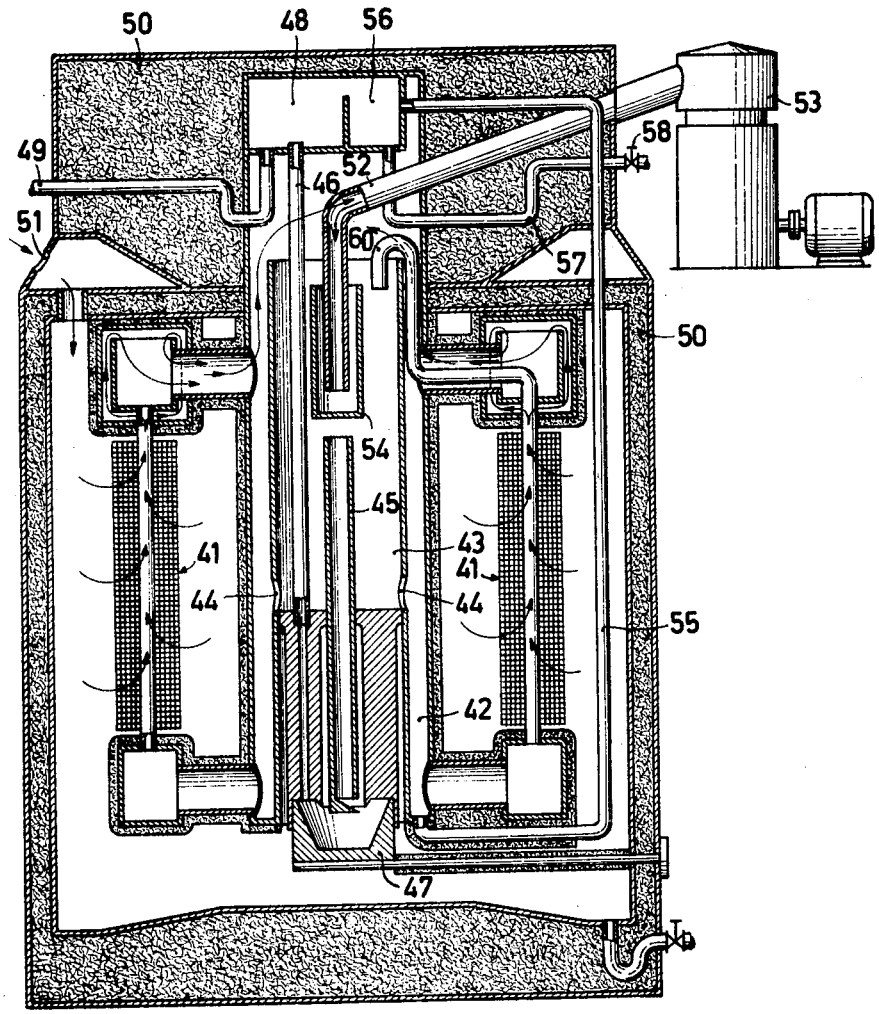

A further possibility of avoiding the accumulation of acetylene is illustrated in FIG. 7. The evaporator pipe 60 in the devices 41 is constructed so that it opens out at its upper end in the collecting container 43. Thus part of the liquid in the devices 41 is continuously replaced by a quantity of liquid having a lower acetylene percentage. The evaporator pipe 60 may open out, instead of into the container 43, rather in the downtake 45 of the vapor bubble pump. The liquid flowing out of the pipe 60 is then directly conducted away by the vapor bubble pump.

Thus by structurally extremely simple means a satisfactory safety device is obtained against the danger of explosions owing to an excessively high percentage of acetylene in the liquid air. In all these cases provisions must be made that the quantity of liquid flowing from the device for separating out constituents from the gas mixture is so large that no accumulation of acetylene occurs, while the condensation of the supplied air on the gauze layers must not be initiated.

While we have described our invention in connection with specific embodiments and applications, other modifications thereof will be readily apparent to those skilled in this art without departing from the spirit and scope of the invention as defined in the appended claims.

We claim:

1. An apparatus associated with a system for liquefying a gas mixture by cooling and separating out potentially hazardous constituents comprising a first vertical insulated container for liquid air, a second vertical container extending from the bottom of the first container and concentric therewith to provide an annulus between the first and second containers, said second container open at top for communication with the first container, a Sterling cycle refrigerator communicating with the said opening, a bore in the second container adjacent to the bottom of second container communicating with said first container, a first lower and second upper duct communicating with the bottom and top respectively of the first container, a thermo-syphon pump conduit communicating between the first and second ducts respectively, the said communication with the second duct comprised of a trough intermediate the thermo-syphon pump conduit and the said second duct, a gauze layer surrounding and in thermal contact with the pump conduit, means admitting an air stream for flow through the gauze and vents in surrounding relationship to the trough and into the open top of the trough and thence into the second duct for flow through the first container, and a liquid trap for the continuous removal of liquid from the first container.

2. An apparatus as claimed in claim 1 wherein said second container is provided with a plurality of bores positioned at different levels therein.

3. An apparatus as claimed in claim 1 further comprising an exit duct connected to said first lower duct, and an evaporator communicating with said exit duct, said liquid leaving said apparatus through said exit duct and into said evaporator where said liquid is evaporated.

4. An apparatus associated with a system for liquefying a gas mixture by cooling and separating out potentially hazardous constituents comprising a first vertical insulated container for liquid air, a second vertical insulated container concentric with said first vertical insulated container and providing an annulus therebetween, said first container being open at the top for communication with said second container, a Sterling cycle refrigerator communicating with said first container, a bore in said first container to permit the liquid air therein to pass through to said second container, a liquid collecting container located above said first and second containers, first and second thermo-syphon pump conduits, a first lower and a second upper duct operatively connected to each of said first and second pump conduits, a third thermo-syphon pump conduit connecting the bottom of said first container to said liquid collecting container, said first lower and second upper ducts being connected with said second vertical insulated container, one of said pump conduits connecting the bottom of said second container with the top of said first container, a gauze layer surrounding and in thermal contact with each of the pump conduits, means admitting an air stream for flow through each of the gauze layers and into said upper ducts for flow into said second container, and a liquid trap for the continuous removal of liquid from said liquid collecting container.

5. An apparatus as claimed in claim 4 further comprising a collecting trough in said first container for receiving the condensate from said Sterling cycle refrigerator, and a downtake pipe for said third thermo-syphon pump conduit located in said first container under said collecting trough.

References Cited by the Examiner
UNITED STATES PATENTS

| | | | |
|---|---|---|---|
| 2,650,482 | 9/1953 | Lobo | 62—18 |
| 2,897,656 | 8/1959 | Van der Ster | 62—13 X |
| 2,903,859 | 9/1959 | Kahl | 62—18 |
| 2,918,801 | 12/1959 | First | 62—14 |

NORMAN YUDKOFF, *Primary Examiner.*